(12) United States Patent
Achenbach

(10) Patent No.: US 7,299,908 B2
(45) Date of Patent: Nov. 27, 2007

(54) SHOCK ABSORBER

(75) Inventor: Martin Achenbach, Biel (CH)

(73) Assignee: DT Swiss Inc., Grand Junction, CO (US)

( * ) Notice: Subject to any disclaimer, the term of this patent is extended or adjusted under 35 U.S.C. 154(b) by 137 days.

(21) Appl. No.: 11/010,181

(22) Filed: Dec. 10, 2004

(65) Prior Publication Data

US 2005/0212187 A1 Sep. 29, 2005

(30) Foreign Application Priority Data

Dec. 12, 2003 (DE) .............................. 103 58 331

(51) Int. Cl.
*F16F 9/00* (2006.01)
(52) U.S. Cl. .................. 188/316; 188/289; 188/322.22
(58) Field of Classification Search ................ 188/280, 188/282.1, 282.8, 289, 316, 305, 320, 322.11, 188/322.22, 322.15; 267/64.18, 286, 291
See application file for complete search history.

(56) References Cited

U.S. PATENT DOCUMENTS

| | | | | | |
|---|---|---|---|---|---|
| 4,220,228 A | * | 9/1980 | Kato | ........................ | 188/282.1 |
| 4,671,392 A | * | 6/1987 | Wossner | ................... | 188/266.3 |
| 4,850,461 A | * | 7/1989 | Rubel | ...................... | 188/282.1 |
| 5,014,966 A | * | 5/1991 | Wang | ....................... | 267/64.26 |
| 5,058,715 A | * | 10/1991 | Silberstein | ................... | 188/280 |
| 5,097,929 A | * | 3/1992 | Spoto | ....................... | 188/282.1 |
| 5,305,860 A | * | 4/1994 | Rotharmel et al. | ...... | 188/266.2 |
| 5,392,885 A | * | 2/1995 | Patzenhauer et al. | .... | 188/282.1 |
| 5,810,128 A | * | 9/1998 | Eriksson et al. | ............ | 188/289 |
| 6,328,291 B1 | * | 12/2001 | Marzocchi et al. | ...... | 267/64.15 |
| 6,702,075 B2 | * | 3/2004 | Hartel | ..................... | 188/282.1 |

* cited by examiner

*Primary Examiner*—Pam Rodriguez
(74) *Attorney, Agent, or Firm*—Greer, Burns & Crain, Ltd.

(57) ABSTRACT

A device for absorbing shocks, in particular for two-wheeled vehicles, having
at least a chamber filled with a fluid medium;
at least a piston means (20) movable in the longitudinal direction of the chamber which divides the chamber at least into a first subchamber (21) and at least a second subchamber (22);
at least a valve positioned between the first subchamber (21) and the second subchamber (22) which can be brought into at least two different positions, wherein at least in a, first valve position with the piston means applying a force relative to the chamber substantially no medium flow occurs at least in a first direction from the second subchamber (22) into the first subchamber (21);
wherein at least in a second position of the valve (28), with the piston, means applying a force relative to the chamber, medium flow occurs at least in the first direction from the second subchamber (22) into the first subchamber (21).

64 Claims, 11 Drawing Sheets

SHOCK ABSORBER

BACKGROUND

The present invention relates to a device for absorbing shocks. Although the invention is described with reference to bicycles, it should be noted that it can as well be used with other two-wheeled vehicles such as motorbikes, mopeds, motor scooters and the like.

Such absorber devices for bicycles are known from the prior art. Such devices allow to buffer or damp the front wheel or the rear wheel relative to the frame in the case of impacts acting on the wheels such as they occur in rides across bumpy terrain or over the curb.

Such absorber devices use a chamber filled with a liquid medium within which a piston moves such that the medium passes through. For this purpose the piston may be provided with apertures. The cross-sectional area of said apertures allows to regulate the quantity of the medium passing through the piston and thus the absorbing factor.

However, not every riding situation calls for an absorber response. For example during pedaling the load on the bicycle rear construction varies. In these cases, an absorber response damping the rear construction relative to the frame is not always desired to the same degree. On the other hand, when the bicycle rides across rough terrain such as over rocks and the like or over curbs, the absorber should be full in action.

SUMMARY

It is therefore the object of the present shock absorber to provide an absorber means with different absorbing reactions to impacts of different strength on the bicycle.

It is a further object to provide an absorber device having reduced weight compared to the prior art.

A device for absorbing shocks for two-wheeled vehicles comprises at least a chamber filled with a fluid medium and at least a piston means movable in the longitudinal direction of the chamber and dividing the chamber at least into a first subchamber and at least a second subchamber. In addition there is preferably provided between the two subchambers a valve adapted to take at least two different positions wherein at least in a first valve position, when the piston means applies a force relative to the chamber at least in a first direction, there is substantially no medium flow from the second subchamber into the first subchamber wherein the first subchamber preferably is on the actuating shaft side. Moreover, at least in a second valve position, when the piston means moves in a first direction relative to the chamber, medium flow occurs from the second subchamber into the first subchamber, and when the piston means moves in a second direction of movement relative to the chamber, there is medium flow from the first subchamber into the second subchamber.

This means that the valve has at least an open position and a closed position. In the open position the fluid medium can pass through the valve and thus between the two subchambers from one subchamber into the other subchamber. In this case the piston means is capable of moving relative to the chamber. The chamber is preferably the interior of a substantially cylindrical body. Said second valve position, presently the open position, thus allows the piston means to move relative to the chamber in both directions. Contrary to this, in the closed position, i.e. the first valve position, no medium can flow at least in a first direction and thus there is substantially no movement relative to the chamber. It is preferred though that some absorbing capacity is maintained in the gas cushion behind the floating piston. Preferably the first direction is the direction of compression, i.e. the direction in which the absorber is compressed. The second direction is preferably the direction of expansion, i.e. an expansion of the absorber occurs.

The piston means is substantially guided such within the chamber that at least in one direction of movement the fluid medium can pass only through the valve between the two subchambers such that when the valve is closed movement is substantially prohibited.

Another preferred embodiment provides in the first valve position, when the piston means moves in the second direction relative to the chamber, that medium can flow from the first subchamber into the second subchamber. This means that even when the valve is closed, movement is possible in the second direction. This means that the absorber can expand even when the valve is closed. The advantage is that even when the valve is closed, the absorber can be transferred into a completely: expanded state and thus the entire piston travel can be used for absorbing when bumps occur.

In another preferred embodiment, a specified pressure in the liquid medium can be used to shift the valve from the first position into the second position. This means that below a specified pressure, the valve remains in the closed position and in said closed position the absorber can only be compressed to a very slight extent. As soon as the pressure applied to the valve or the piston means exceeds said specified value, the valve opens, allowing the piston means to move in the direction of compression, and the absorber can operate in the direction of compression stage.

Pressures below said specified pressure occur for instance by simple pedaling such that in this case the absorber only allows said very slight movement in the direction of compression.

It is preferred that as soon as the pressure applied to the valve reaches a specified threshold level, the valve shifts from the first position to the second position. The specified threshold level is for example reached or exceeded in rides across rough terrain, over rocks and the like. The first valve position is understood to be the closed position and the second valve position, the open position.

Said specified threshold level is preferably adjustable by means of a regulating means coupled to the valve. For this purpose the actuating shaft comprises a hollow space extending axially which functionally connects the master and slave components of the valve means.

The hollow space contains a fluid medium which acts preferably on the valve. There is furthermore provided a master piston, preferably in the end region of the actuating shaft opposite the valve. Due to the position of said master piston, more precisely through spring forces acting on the master piston, the pressure applied to the valve and thus the specified threshold level for shifting the valve from the first position to the second position, can be varied.

For this purpose the regulating means preferably comprises biasing means for biasing the master piston. Said biasing means may for example be springs which bias the master piston such that a specified pressure of the medium is applied to the valve. As soon as the valve closing force effected by the spring force is overcome by the pressure occurring in the second subchamber, the valve opens, allowing a distinct spring deflection.

Thus a hydraulically operated regulating mechanism is proposed for regulating the threshold pressure level at which the valve shifts from the first position to the second position.

Said hydraulically operated regulating means is reduced in weight compared to mechanically operated devices since force is not transferred for example by means of metal elements but by means of a fluid medium.

It is also preferred to vary the position of the master piston relative to the device and thus also the pressure acting on the valve, by means of an adjusting mechanism. This configuration is advantageous insofar as the rider can readily adjust the specified pressure of the medium for shifting the valve from the first position to the second position without needing accessories such as tire pumps and the like. Adjustment is done via the control equipment which serves for example to vary the force which the biasing means applies to the master piston or else the position of the master piston.

Another advantage of the preferred embodiment is that the master component can be freely positioned which, unlike mechanical actuation, does not require axially operating an actuating shaft.

An additional advantage of the preferred embodiment is the freedom obtained in designing and shaping the end cover region of the actuating shaft at the end away from the piston which allows a larger volume of the pneumatic spring while maintaining the construction length.

In another preferred embodiment the path on which the fluid medium passes from the first subchamber through the piston means into the second subchamber is at least in portions different from the path on which the fluid medium passes from the second subchamber through the piston means in the first subchamber. The advantage of said configuration is that independent of open or closed valve positions the piston can expand at all times even though to a limited, adjustable, extent.

It is also conceivable that the medium, as it passes from one subchamber for example from the first subchamber into the second subchamber, can travel on one path only whereas as it passes from the second subchamber into the first subchamber it can additionally travel on other pathways. The individual paths may also be selected reversely, meaning that as the medium passes from the second subchamber into the first subchamber, two pathways may be provided whereas as it passes from the first subchamber into the second subchamber only one of the two pathways is available.

In another preferred embodiment a substantially annular sealing element is attached to the valve. This may for example be a disk-shaped element having a center aperture that covers flow-through means in the region of the valve under specified conditions.

In another preferred embodiment the medium is at least in portions guided on a rotationally symmetric path as it flows from the second subchamber into the first subchamber. This means that the aperture in the piston means through which the medium is allowed to pass, extends substantially around the entire circumference of the valve means wherein substantially is understood to mean that connecting links and the like may be provided.

In another preferred embodiment a second chamber filled with a second medium is positioned substantially rotationally symmetrical in the first chamber. This means that preferably the outer wall of the first chamber at least in part doubles as the inner wall of the second chamber. It is particularly preferred to vary the pressure of the second medium within the second chamber. The second chamber serves for example to guarantee the springing properties of the absorber device. The second medium is preferably a gaseous medium and particularly preferred it is air. The air is fed into a second chamber at a specified pressure wherein pushing the entire absorber means together causes the air to be compressed so as to achieve pneumatic springing.

Instead of air or pneumatic springing other absorbing or springing mechanisms such as coil springs or the like can be used. The absorber device preferably comprises a valve through which the second chamber can be filled with air.

The first medium is preferably oil or the like, particularly preferred it is a medium with a higher viscosity than water.

In another preferred embodiment the actuating shaft comprises an outer shaft element and an inner shaft element wherein the inner shaft element can rotate relative to the outer shaft element. It is preferred that rotating the inner shaft element relative to the outer shaft element also causes the inner shaft element to shift in longitudinal direction relative to the outer shaft element. For this purpose a thread is provided between the two shaft elements such that rotation results in axial displacement of the inner shaft element relative to the outer shaft element.

Said displacement serves to regulate the quantity of fluid medium, i.e. preferably of oil that is allowed to pass the piston means as the piston means moves preferably in the direction of expansion.

For this purpose a control means is provided at the end of the shaft element opposite the piston means so as to enable the user to control or regulate the quantity of the oil passing through the piston means by displacing the shaft elements relative to one another.

BRIEF DESCRIPTION OF THE DRAWINGS

Further advantages and embodiments of the present shock absorber can be taken from the accompanying drawings.

DETAILED DESCRIPTION

Figure 1A:
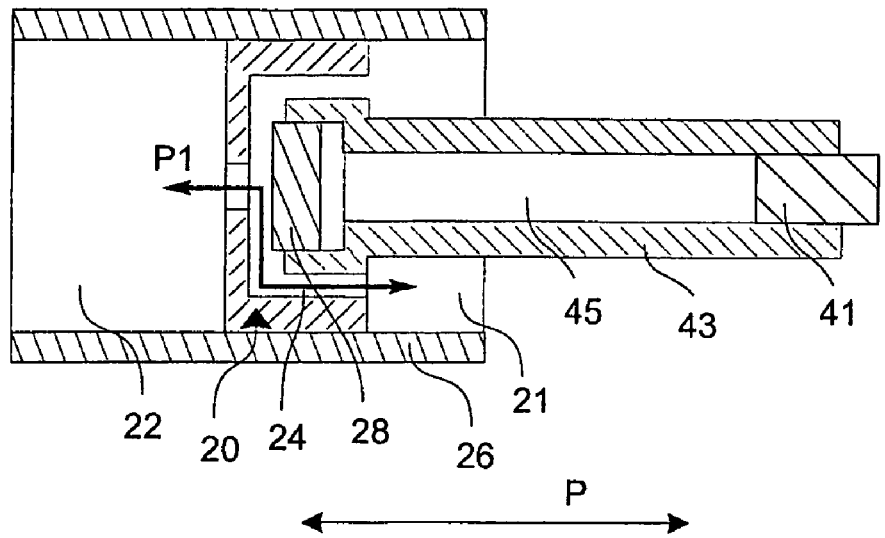
FIG. 1a is a schematic representation illustrating the present shock absorber.

FIG. 1a is a schematic representation of an absorber device. Reference numeral 26 indicates an oil chamber in the interior of which a piston means 20 can in principle move in the direction of the double arrow "P". A piston means 20 serves to divide the chamber formed in the oil chamber 26 into a subchamber 21 on the right and a subchamber 22 on the left.

The devices known from the prior art provide that as the piston means 20 moves to the left relative to the oil chamber 26, a fluid medium provided both in the subchamber 21 and subchamber 22 passes through the piston means 20 from the subchamber 22 into the subchamber 21. In the reverse direction, as the piston moves to the right in the direction of the arrow, the fluid medium passes from a subchamber 21 into a subchamber 22.

Figure 1B:
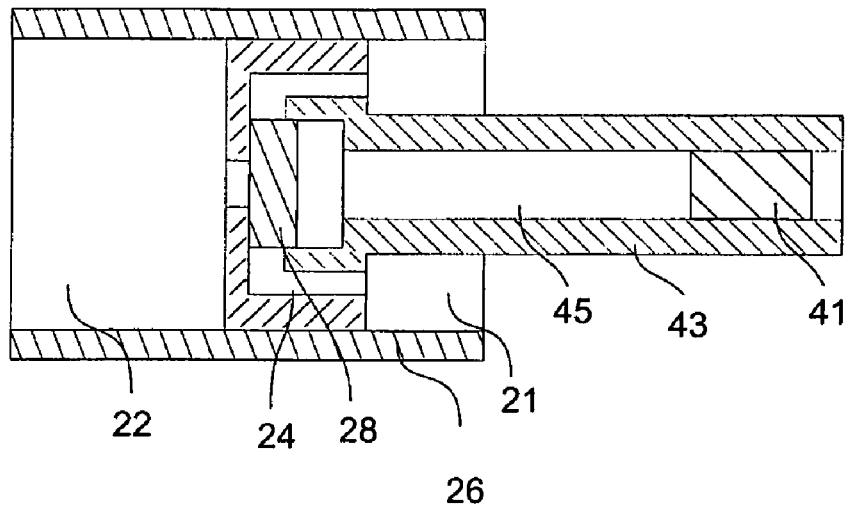
FIG. 1b is another schematic representation illustrating the present shock absorber.

Reference numeral 28 indicates a valve which can be positioned at least in an open position shown in FIG. 1a and a closed position shown in FIG. 1b. When the valve 28 is in the open position shown in FIG. 1a, the medium can pass in the direction of the arrow "P1" both from the subchamber 22 on the left into the subchamber 21 on the right and reversely from the subchamber 21 on the right into the subchamber 22 on the left.

When the valve 28 is in the closed position shown in 1b, a passage of the fluid medium from the second subchamber 22 into the first subchamber 21 through the piston means 20 is substantially prohibited. In this case movement of the piston means 20 relative to the oil chamber 26 is substantially prohibited.

A regulating means 41 serves to adjust the position of the valve 28. For this purpose a fluid medium is provided in the hollow space 45 of the actuating shaft 43. A movement of the master piston 41 for example to the left causes the position of the valve 28 to shift towards closed. Reversely, a movement of the master piston 41 to the right causes the position of the valve 28 to shift towards open.

A movement of the piston means 20 to the left causes the medium provided in the subchamber 22 to apply a specified force to the valve 28. If that force exceeds the force applied through the medium in the chamber 45, which is adjustable through the master piston 41, the valve 28 opens, allowing medium to flow through in the direction of the arrow "P1".

While the valve 28 is in the left position shown in FIG. 1b, no medium flows from the subchamber 22 on the left into the subchamber 21 on the right.

Figure 2A:
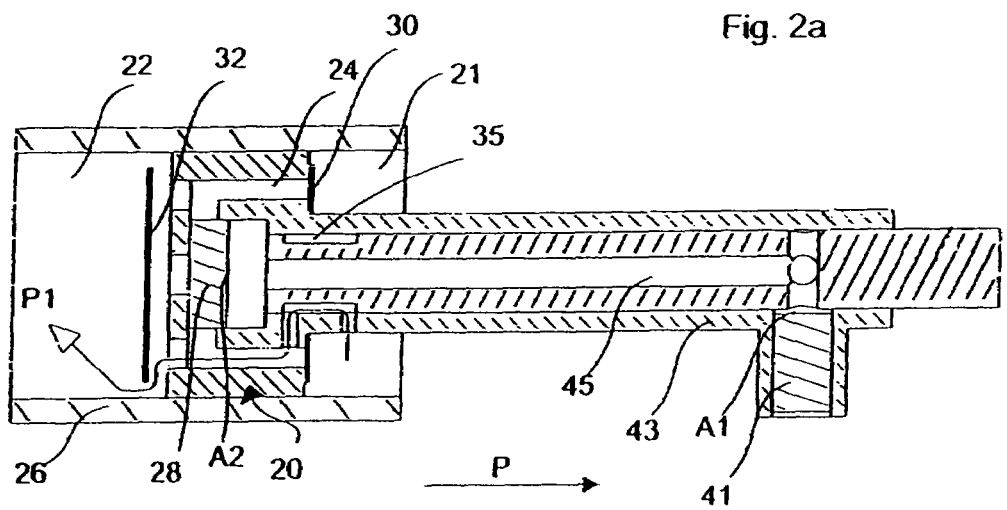
FIG. 2a is a detailed representation illustrating the present shock absorber.
Figure 2B:
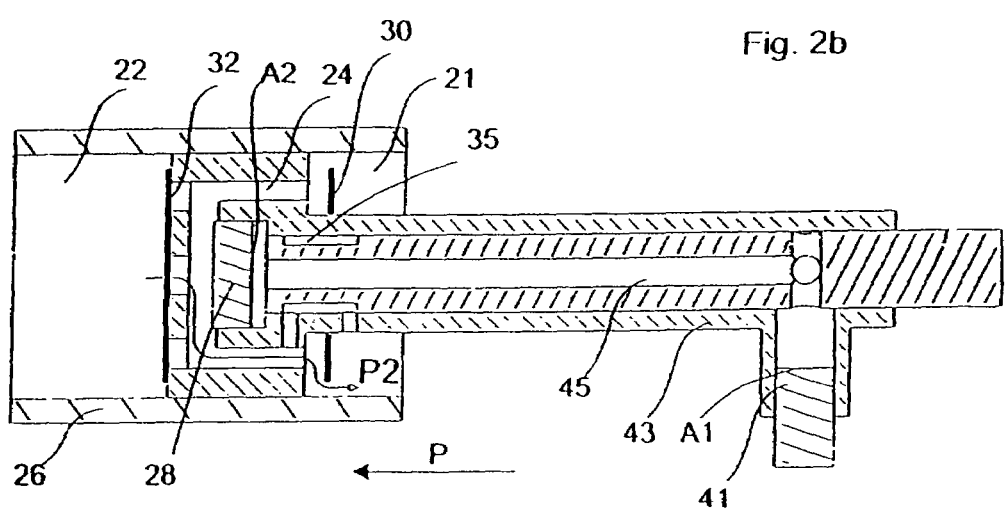
FIG. 2b is another detailed representation illustrating the present shock absorber.
Figure 2C:
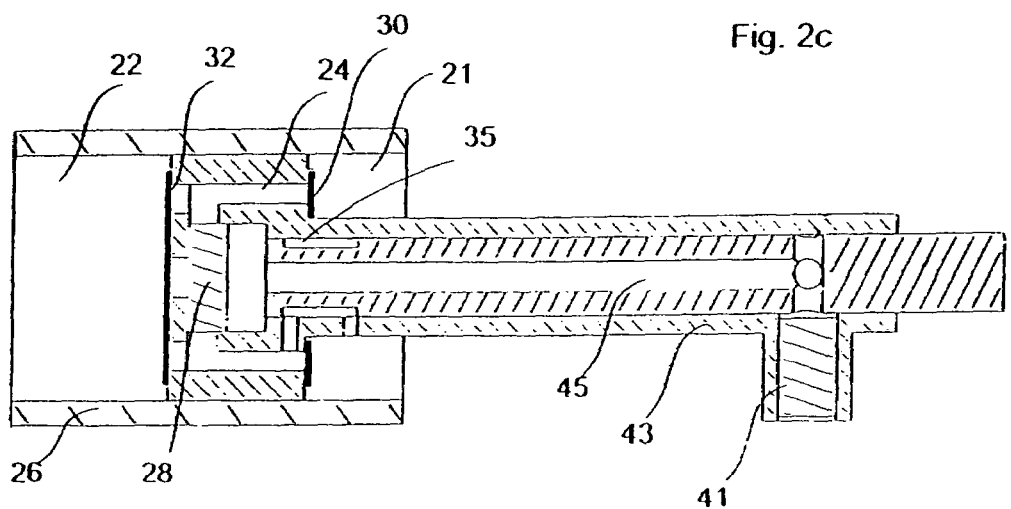
FIG. 2c is another detailed representation illustrating the present shock absorber.

FIGS. 2a through 2c show a more detailed illustration of the present shock absorber. FIG. 2a illustrates a situation where when the valve 28 is closed, the absorber device expands, i.e. the piston means 20 moves to the right relative to the oil chamber 26. FIG. 2b illustrates a situation where the valve 28 is open and the absorber device is compressed.

FIG. 2c illustrates the idle position of the absorber or the situation where the pressure rise in the chamber on the compression side is still too low for opening the valve.

Above the piston means a first sealing means 30 is provided which is an annular element covering the end in the right of the passage 24 of the piston means.

Reference numeral 32 indicates a substantially disk-shaped sealing means on the left which, depending on the direction of movement of the piston means 20 relative to the oil chamber 26 either contacts the piston means 20 or is spaced from it.

The arrow "P1" indicates the direction of flow of the medium from the subchamber 21 on the right into the subchamber 22 on the left during expansion of the absorber device. Accordingly the medium flows along a channel 35, then into the connecting channel 24 and finally past the sealing means 32 on the left into the subchamber 22 on the left.

It can be seen that although the valve 28 is closed in FIG. 2a, in the case of the absorber device expanding, i.e. the piston means 20 moving to the right, medium flow from the subchamber 21 into the subchamber 22 is still possible, meaning that it does not depend on the open or closed position of the valve 28.

FIG. 2c in contrast illustrates the situation where when the valve 28 is closed, compression of the absorber device occurs. In this case the sealing means 32 on the left prohibits a medium flow from the second subchamber 22 into the first subchamber 21. In this way, movement in the direction of compression is substantially prohibited.

FIG. 2b illustrates a situation when the valve is open. In this case the fluid medium can pass through the open center of the sealing means 30 via the channel 24 from the second subchamber 22 into the first subchamber 21. It should be noted that the medium substantially flows through the channel 24 on the illustrated path P2. However, small quantities can also flow through the channel 35 of the piston means from the subchamber 22 on the left into the subchamber 21 on the right.

Preferably the flow cross-section in a portion of the channel 35 is smaller than in channel 24 since it is particularly preferred to obtain a compression stage resistance significantly reduced relative to the rebound stage when the valve is open. The pressure to the rear of the valve 28 can be varied through the master piston 41.

Preferably a biasing means (not shown) is provided which according to FIGS. 2a through 2c applies a specified upward force to the master piston 41. In this way a specified pressure is applied to the piston valve 28. Not before the pressure preset by said biasing means such as a spring is overcome can the valve 28 shift from the closed position to the open position. Said pressure can further be adjusted through the pressure applied to said master piston 41 and thus can the pressure required for shifting the valve 28 from the closed position into the open position.

The biasing means further causes the valve to return from the open position into the closed position when the pressure in the chamber 22 falls below the specified threshold pressure level.

Moreover, the relation of the piston cover surface Al of the master piston 41 to the valve cover surface A2 serves to achieve a gear ratio step-up or reduction between displacement of the master piston 41 and the resulting changed pressure acting on the valve 28. If for example a small surface Al and a comparatively large surface A2 is selected, the master piston 41 requires a comparatively small biasing force to effect a change of the specified pressure threshold at the valve 28. Or reversely, if a large surface Al of the master piston is selected, then a low biasing force acting on the master piston 41 relative to the actuating shaft 43 causes considerable change in the pressures acting on the valve 28.

Figure 3:
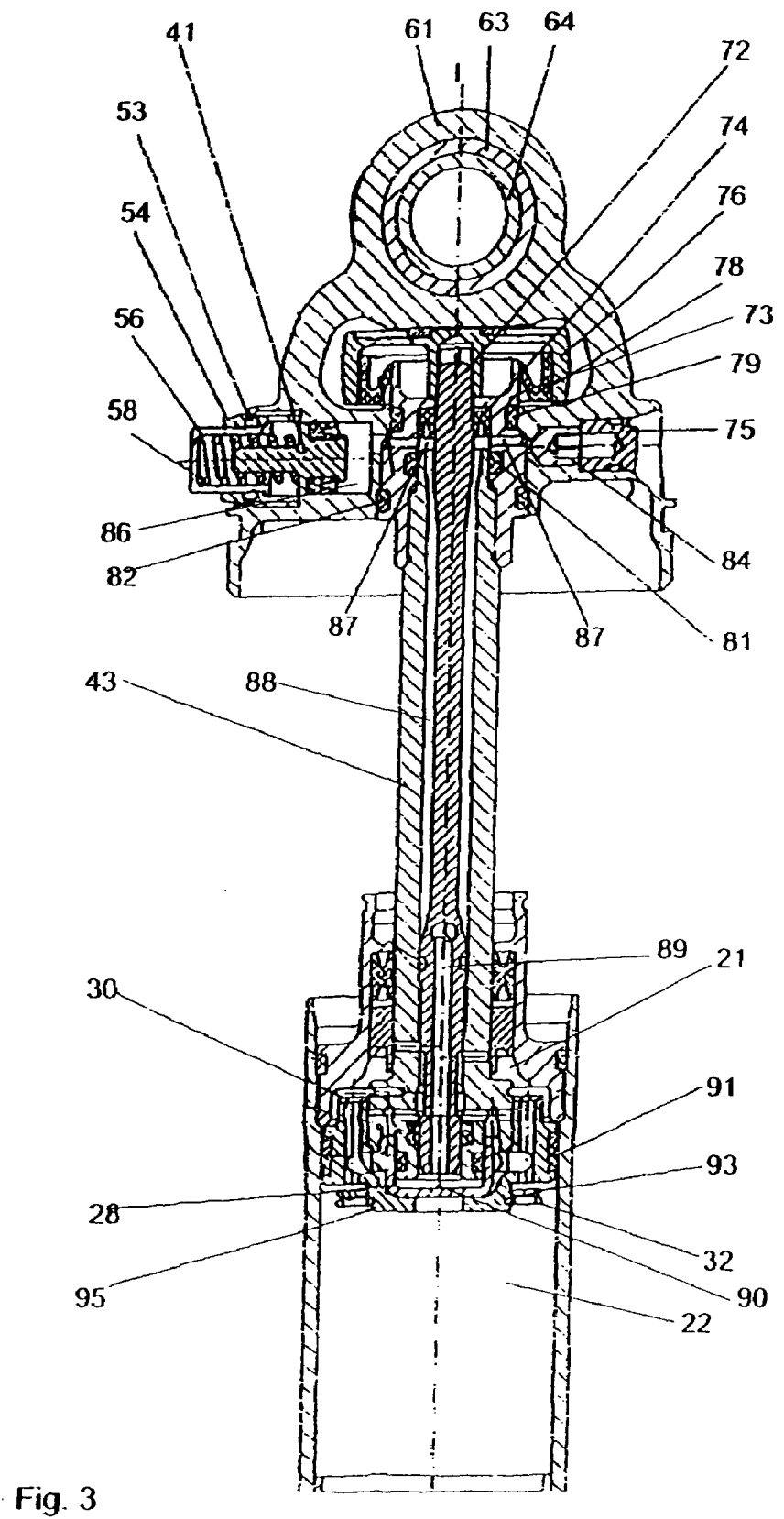
FIG. 3 is a cross-sectional view of a portion of the absorber according to the present shock absorber.

FIG. 3 is a detailed cross-sectional illustration of the present shock absorber. Reference numeral 61 indicates an end surface cover of the absorber device. In a preferred embodiment said cover is at least in portions formed as a sleeve which receives the regulating elements of the absorber device.

Reference numeral 63 refers to a guide ring for a pivot head and reference numeral 64 to a bearing ball in the pivot head. The guide ring and the bearing ball serve to join the absorber device to frame components or other bicycle components. The guide ring 63 and the bearing balls 64 and 164 further ensure that the absorber device is supported to be rotatable about all of its axes relative to the frame component that it is attached to. The guide ring 63 is preferably a component made of reinforced material.

Reference numeral 72 illustrates an inner, extended actuating shaft for regulation. At its upper end region it comprises preferably a polygon end portion that engages with a corresponding aperture in an adjusting knob 76. Turning the adjusting knob 76 rotates the inner actuating shaft 43, displacing it in longitudinal direction. This is the preferred way for regulating the flow cross-section of the pathway where the medium flows from the first subchamber 21 into the second subchamber 22. In this way the rebound damping or the rebound damping factor of the absorber device can be adjusted.

The reference numerals 79, 81, 82 refer to sealing means for preventing fluid medium, i.e. oil, to leak from the device. O-rings are preferably used. Reference numeral 74 refers to a grooved ring positioned opposite the support component 73 for sealing the rotatable inner actuating shaft 43. Reference numeral 78 illustrates a radial shaft seal ring, preferably a lip seal with garter spring, positioned between the control knob and the support component 73.

Reference numeral 75 indicates an end portion of a closing means that serves to feed oil into the regulating means. Said closing means can open and close by means of an adjustment means 84 and it is sealed by means of another sealing ring which is preferably an O-ring so as to prevent oil leaks from the closed circuit in the closed state.

The mode of operation of the regulating means of the valve 28 will now be described.

Reference numeral 41 indicates the master piston which is biased to the right in the Figure, i.e. in the direction of the actuating shaft 43, by means of biasing means 58 which in the present embodiment is a spring. The adjustment chamber 86 positioned to the right of the master piston 41 contains oil to which more or less pressure can be applied through biasing the spring 58 correspondingly.

The regulating force is adjusted in the present embodiment by axially displacing the end portion 56. In the present embodiment, said end portion 56 is a tappet. Reference numeral 53 indicates a sealing means and reference numeral 54 a retaining ring around the tappet.

The adjustment chamber 86 is in fluid connection with the vertical hollow space 89 in the lower portion of the actuating shaft 43, through the horizontal passage 87 and the vertical passage 88 which is preferably positioned rotationally symmetrically around the actuating shaft 43. In this way the oil can pass into the second adjustment chamber 90 above the valve 28.

By laterally displacing the biasing means 58 relative to the master piston 41 the pressure on the oil can be increased or reduced so as to directly affect the pressure within the adjustment chamber 90. In this way the user can preset the specified pressure at which the valve is to shift from the closed position to the open position.

Figure 4:
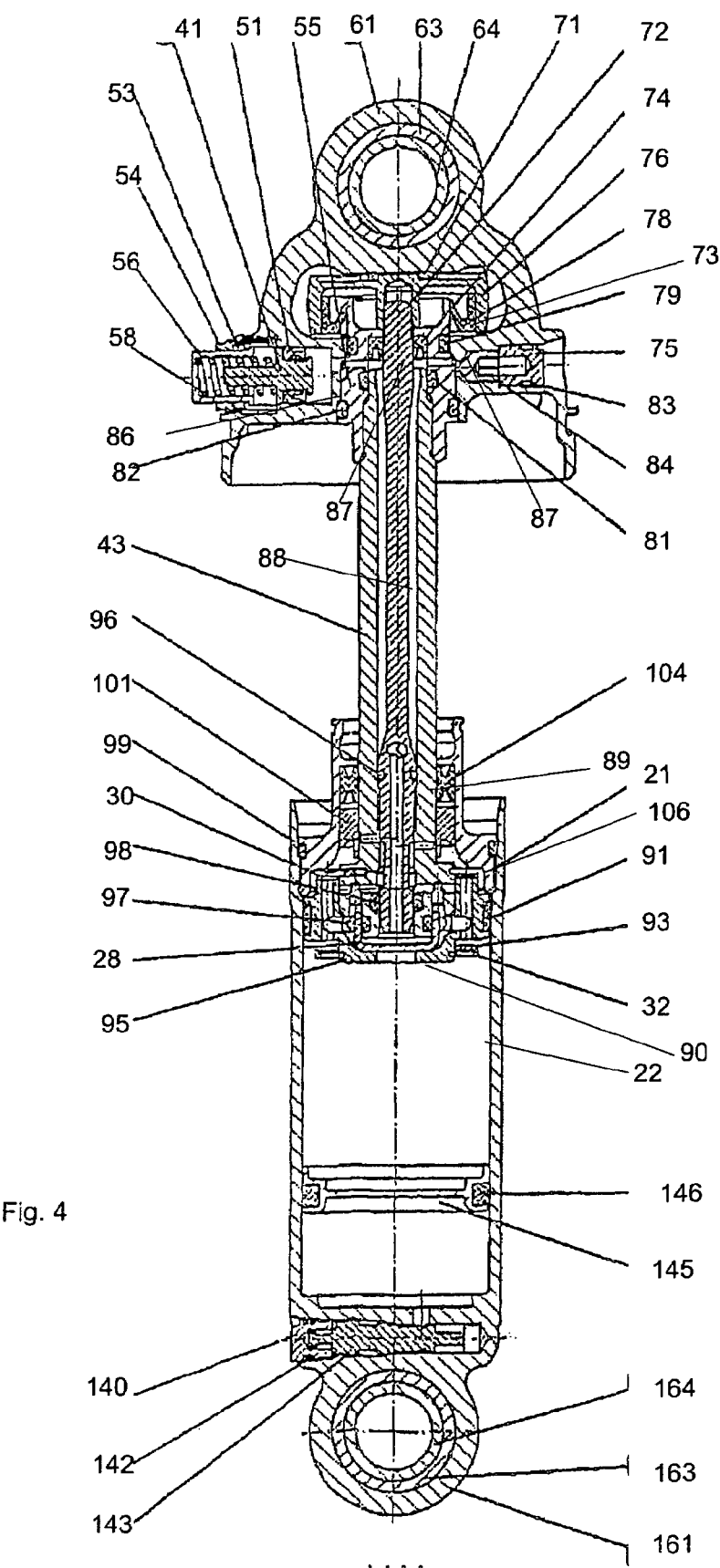
FIG. 4 is a cross-sectional view of the entire absorber according to the present shock absorber.

FIG. 4 is another cross-sectional view of the present shock absorber. Reference numeral 145 refers to a piston means positioned in the second subchamber 22. Reference numeral 146 indicates a sealing means for prohibiting a medium flow past the side of the piston means 145.

Reference numeral 143 indicates a receiving means for another valve through which the chamber between the piston 145 and a lower cover means 161 can be filled with compressed gas. The valve is closed by a valve lid 140 and a sealing means prevents leaks of compressed gas from the closed valve.

Figure 5A:
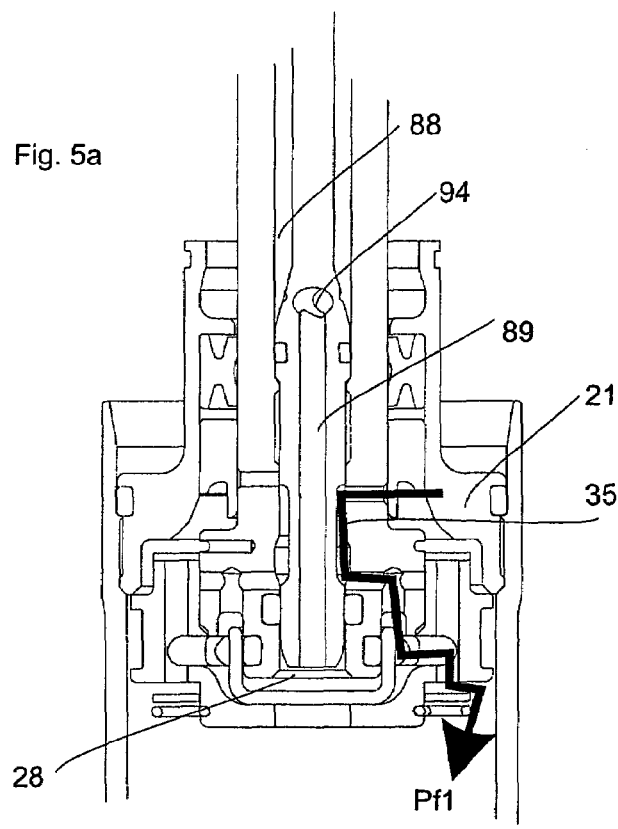
FIG. 5a is a cross-sectional view of the piston means when the valve is closed.
Figure 5B:
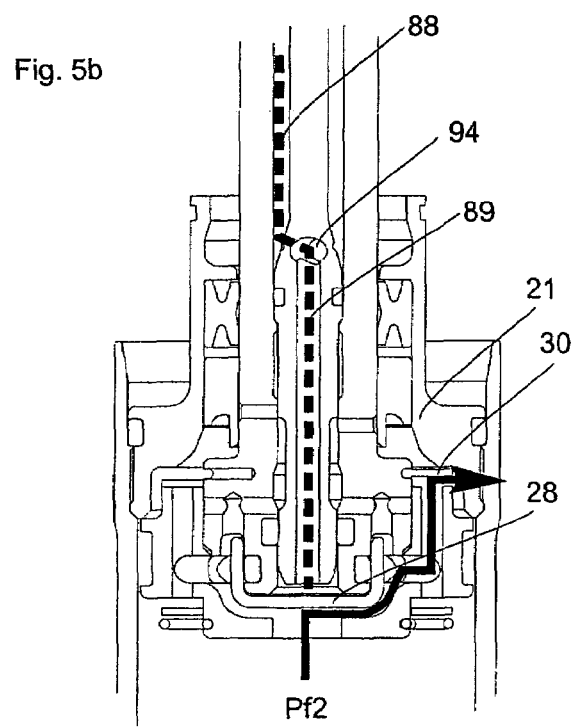
FIG. 5b is a cross-sectional view of the piston means when the valve is open.

FIGS. 5*a* and 5*b* are detailed views of the piston means to illustrate the flow path of the fluid in a compressed (FIG. 5*b*) and an extended (FIG. 5) absorber device.

When the absorber device is compressed while the valve 28 is in the open position, the oil flows on the path indicated at arrow Pf2. The oil first enters the region beneath the valve in the piston means 20. From there it is diverted to the side or in radial direction past the valve 28, leaves the piston means at the open sealing means 30 and enters into the subchamber 21.

An expansion of the piston device results in the situation shown in FIG. 5*a*. In the portion 35 the oil flows substantially parallel to the longitudinal direction of the actuating shaft and it is ultimately led out of the piston means, also past the side of the valve 28.

Both pathways Pf1 and Pf2 are rotationally symmetrical with respect to the actuation means. Generally speaking, the path shown at Pf1 can also be used when the valve 28 is open while the absorber device is being compressed. However, said path has a smaller flow cross-section relative path Pf 2 such that when the valve is open, most of the oil passes along the path Pf 2.

The path Pf 2 is preferably not available while the absorber device is expanding since this is prevented by the sealing means 30.

The dashed line in FIG. 5*b* indicates the region where the regulating fluid, i.e. the fluid medium is located which hydraulically operates the valve 28.

Figure 6:
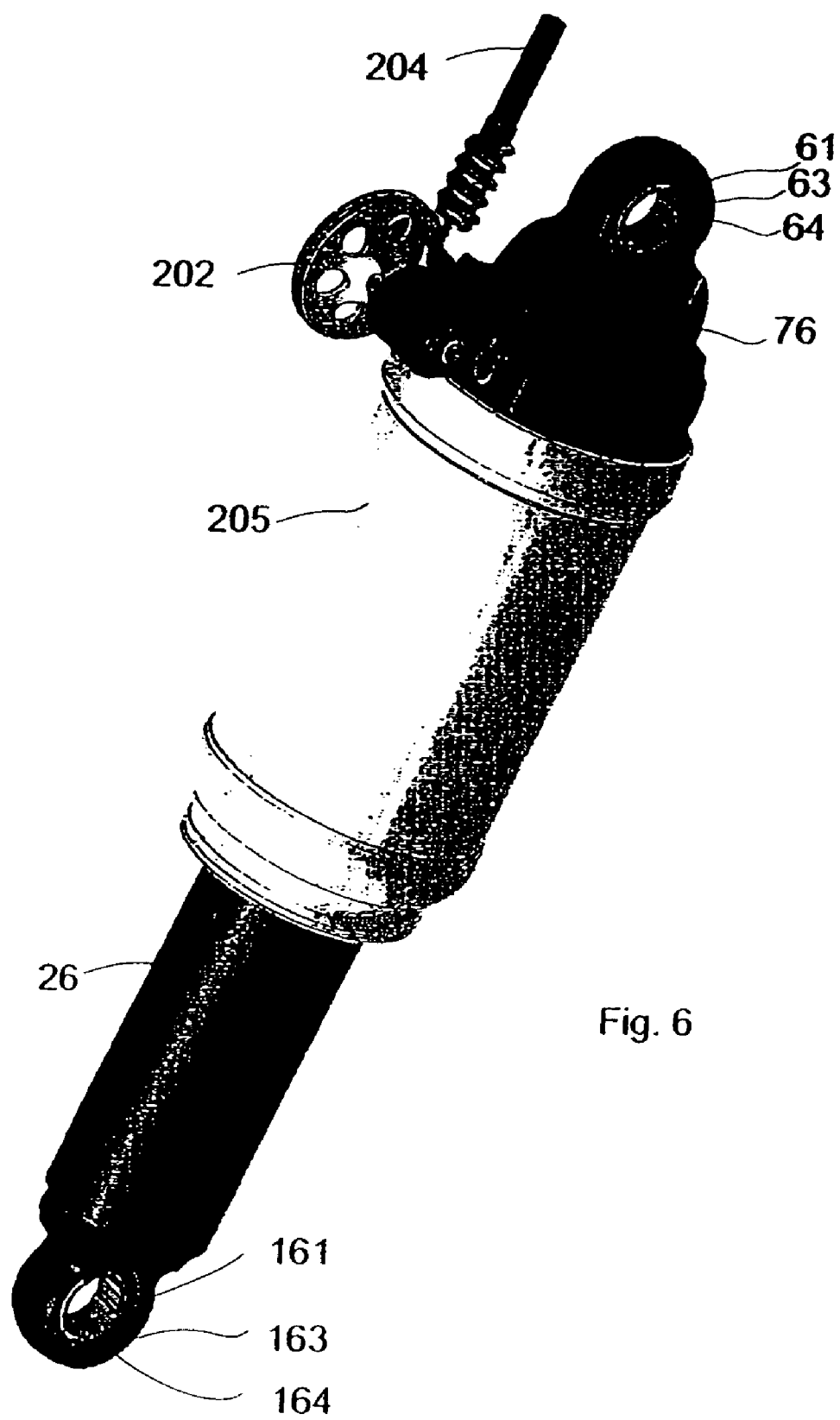
FIG. 6 is a complete illustration of the absorber device according to the present shock absorber.

FIG. 6 is a total illustration of the present shock absorber Herein there is provided, adjacent to the upper cover means 61 that comprises a guide ring 63 and a bearing ball, also the lower cover means 161 that also comprises a guide ring 163 and a bearing ball 164. The reference numeral 204 refers to a control wire which may for example run to an adjust means attached to the handlebar. By means of said control wire the user can turn an adjustment knob 202 and thus preset the specified pressure at which the valve 28 shifts from the closed position to the open position.

Reference numeral 205 indicates an outer absorber element which in the present embodiment is configured substantially cylindrically and arranged rotationally symmetrically around the oil chamber 26. Compressed gas is fed through a valve (not shown) into the hollow space generated between the oil chamber 26 and the outer absorber element 205. Movement of the oil chamber 26 in one or the other direction relative to the outer absorber element compresses or expands said pneumatic spring resulting in the effect of an air spring.

Figure 7:
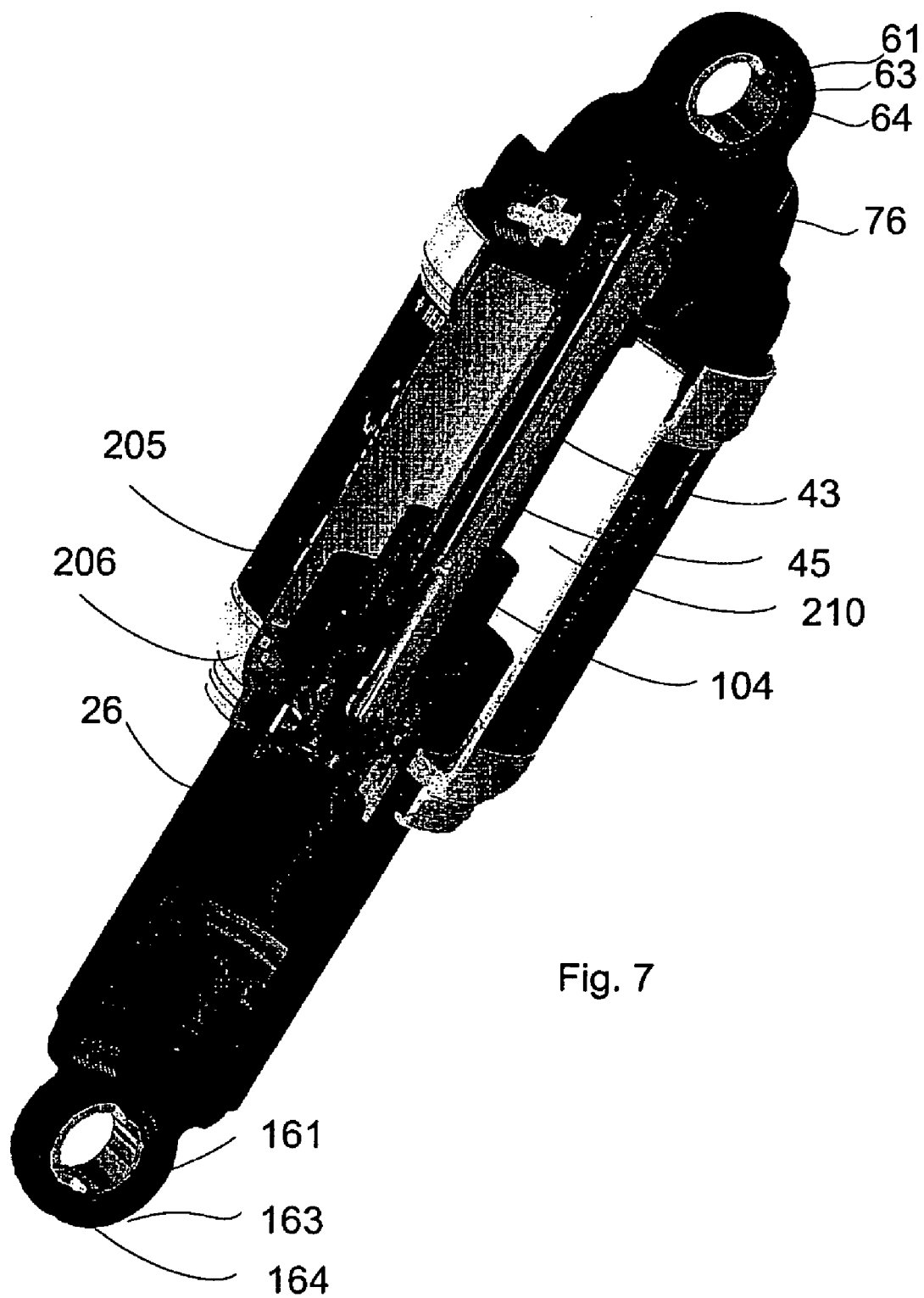
FIG. 7 is a sectional detailed view of the absorber device according to the present shock absorber in FIG. 4.

FIG. 7 is a sectional detailed view of the present shock absorber. Reference numeral 210 indicates the third chamber or pneumatic spring, respectively. Said chamber is compressed as the absorber means is compressed such as to achieve a springing effect.

Figure 8:
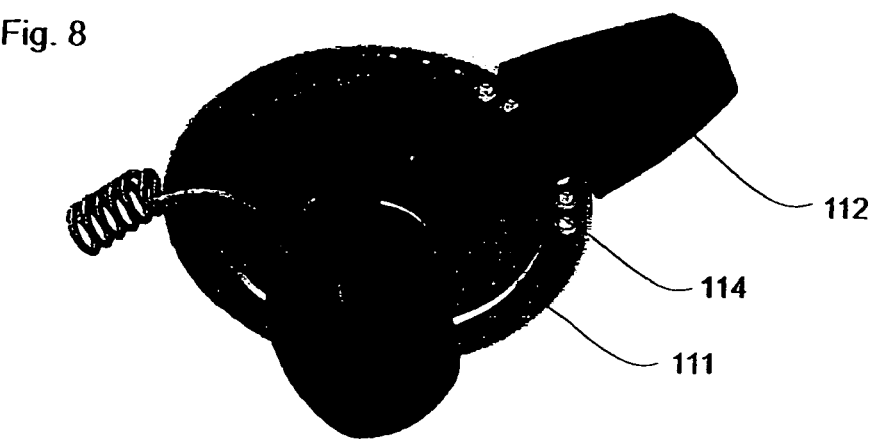
FIG. 8 is a control means for the absorber device of the present shock absorber.

FIG. 8 shows an adjust means that attaches for example to the handlebar or other frame elements.

Reference numeral 111 indicates a control knob having a plurality of apertures 114. Said apertures serve as snap-in apertures for engagement with a correspondingly configured pin (not shown) of the shifting means 112. Turning the shifting means relative to the adjust knob operates a control wire (not shown) and thus the adjust means 202 shown in FIG. 4.

Figure 9:
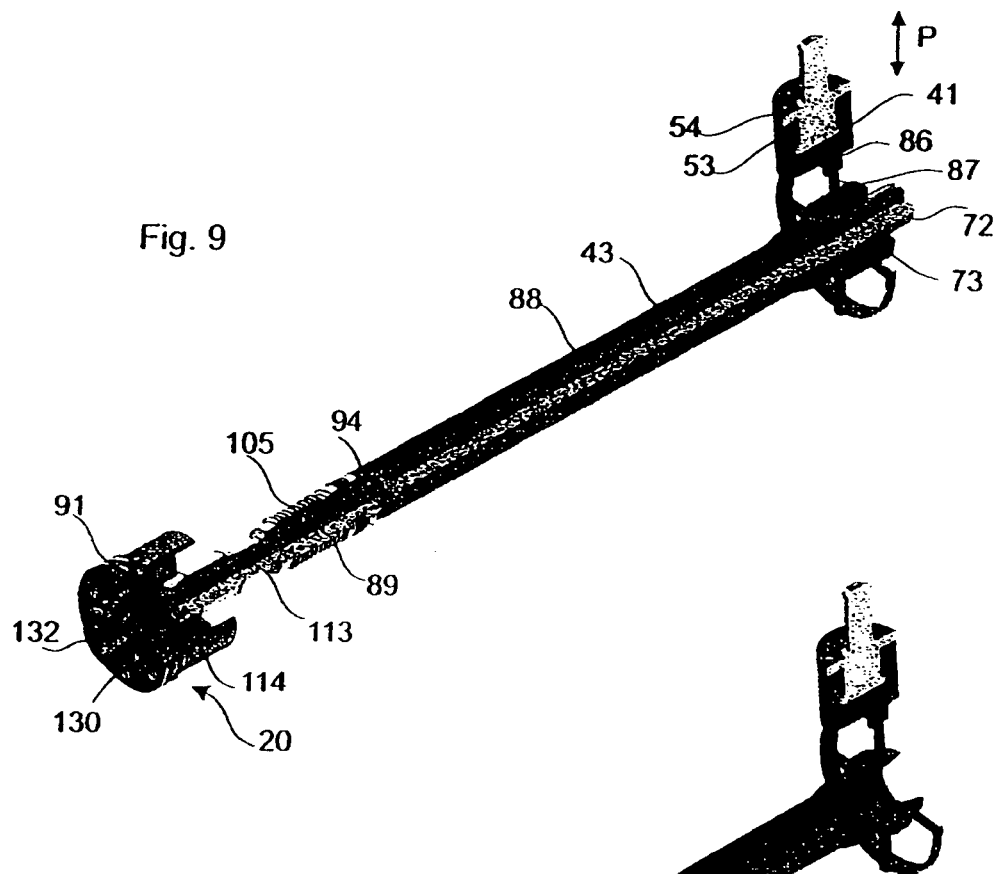
FIG. 9 is an illustration of an actuating shaft for the absorber device of the present shock absorber.

FIG. 9 is a detailed view of the actuating shaft with the piston means 20 positioned at the lower end. Displacing the master piston 41 in the direction of double arrow P will, as described above, expand or reduce the adjustment chamber 86. In this way the piston means 20 can be shifted from the open to the closed position. As can be taken from the Figure, the adjustment chamber 86 is in fluid connection with the valve 28 through a horizontal connection 87, the vertical connection 88 and the second vertical connection 89. The oil flows in the intermediate region 94 from the vertical connection 88 into the vertical connection 89.

Reference numeral 105 indicates a thread which causes the actuating shaft 43 to be displaced lengthwise as it is rotated. Reference numeral 95 indicates the cover portion of the piston means 20. It comprises a plurality of apertures 130 positioned around a center opening 132.

Figure 10:
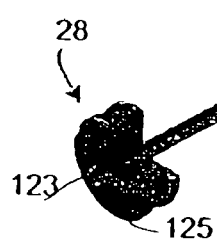
FIG. 10 is another illustration of the actuating shaft and the valve for the absorber device of the present shock absorber.

The piston means 20 further comprises a wall section 114 extending substantially annularly inwardly which extends annularly around the valve 28 in FIG. 10. Reference numeral 91 refers to a sealing means to prohibit oil flow in exchange between control fluid and absorber fluid. Preferably the means is a quadring.

The actuating shaft 43 has a larger diameter region 119 and a smaller diameter region 113 along its longitudinal direction. The smaller diameter region 113 preferably serves as an oil flow path as the absorber device expands.

FIG. 10 is another detailed illustration of the valve 28 of the present shock absorber. It comprises a lower sealing element 125 comprising a central projection 123. Said projection extends into the center opening 132 in the closed position, preferably without closing it. The basic valve shape is substantially cylindrical, i.e. the valve diameter is constant around its longitudinal axis, interrupted only by the sealing ring recess.

The shape of the projection 123 preferably serves to optimize control of the flow direction of the medium. The projection is preferably not intended to have a sealing function.

Figure 11A:
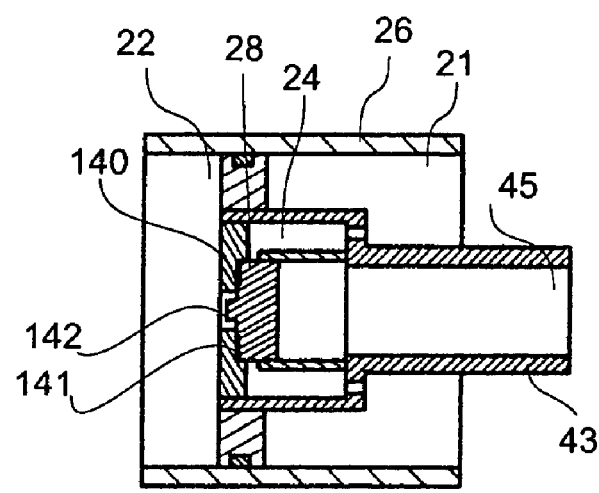
FIG. 11a is an illustration of the function of the valve provided with two stepped front faces.

FIG. 11a shows the valve cross-section of the particularly preferred embodiment in a first, closed position.

Herein the first end face 140 contacts the inside 141 of an upper closing means of the valve chamber which may for example comprise the piston means 20.

Thus the cross-section acting on the valve which the oil in the second subchamber applies pressure to, substantially corresponds to the cross-section of the flow passage 142 in the upper closing means of the valve chamber.

Figure 11B:
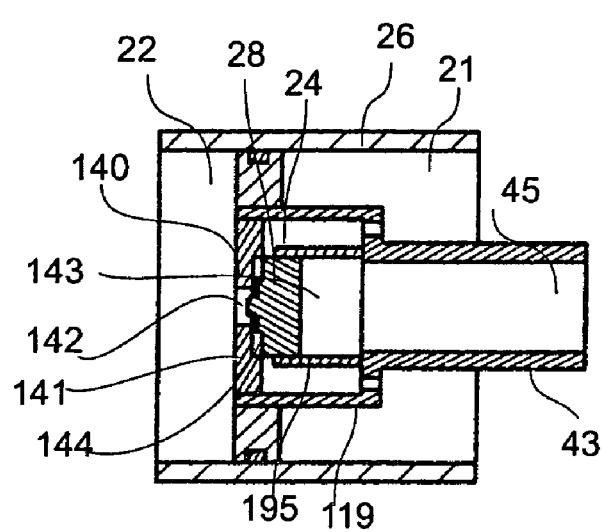
FIG. 11b is an illustration of the function of the valve provided with two stepped front faces.

FIG. 11b shows the situation as the force generated by the oil pressure in the first subchamber in conjunction with the cross-section mentioned above, exceeds the counterforce which is substantially generated by the oil pressure in the control circuit 143 in conjunction with the effective valve cross-section.

As soon as the first end face 140 lifts off the inside 141 of the closing means, the oil from the first subchamber can also apply pressure to the second end face 144 which allows the valve to open particularly fast.

Figure 11C:
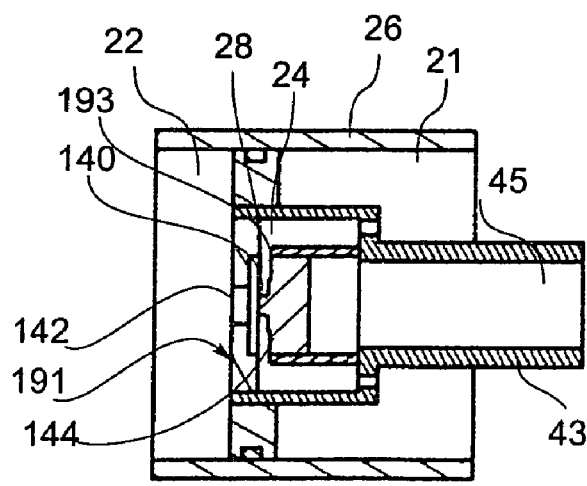
FIG. 11c is an illustration of the function of the valve provided with two stepped front faces.

FIG. 11c illustrates the fully open valve.

Figure 12:
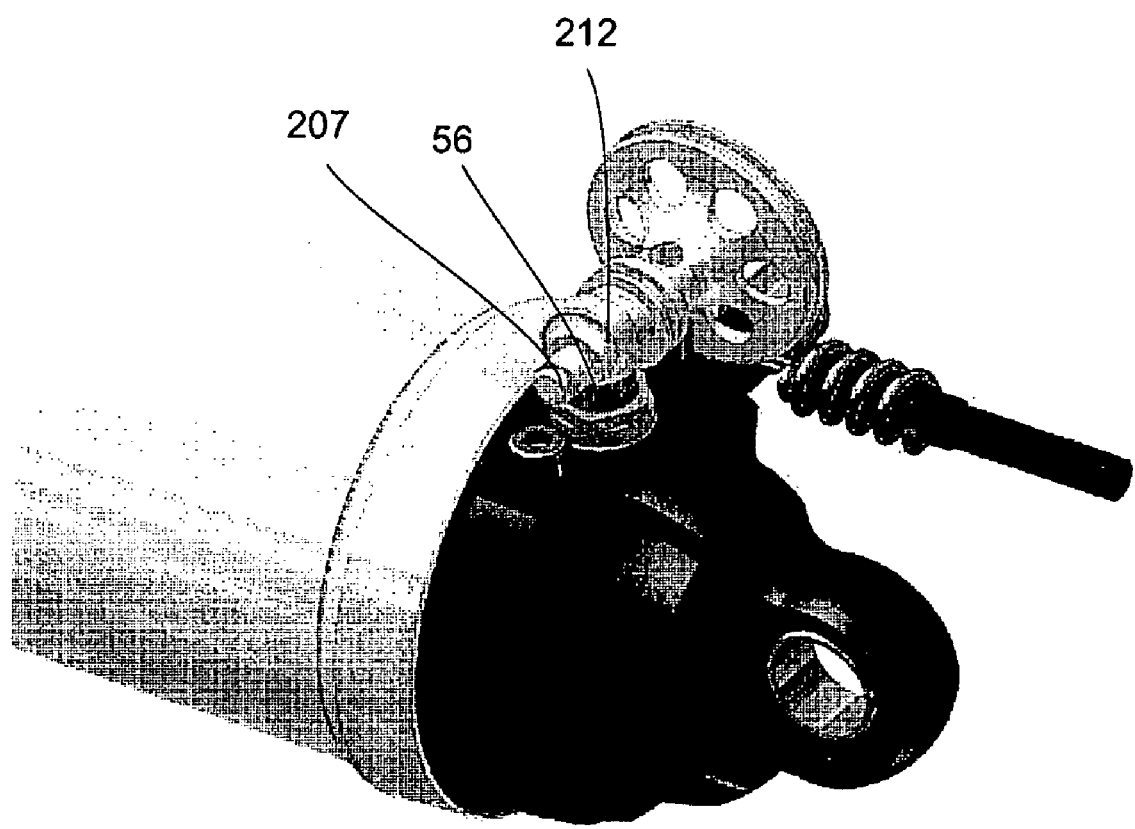
FIG. 12 is another complete illustration of the present shock absorber with the housing of the actuating shaft cut away.

FIG. 12 illustrates the absorber with optional remote control, with the shaft housing cut away.

The cam joined to the shaft actuates the tappet 56 which loads the spring 58 through axial displacement.

In a preferred embodiment the shaft and the cam contour are configured integrally.

In another preferred embodiment the fluid connection 86, 87, 88, 89 between master piston 41 and valve 28 comprises a control device (not shown) which has different passage resistances in the two directions of movement.

As a result of this the valve shifts to the closed position at a lower speed than that with which the force of the spring 58 acts on the master piston 41.

Figure 13:
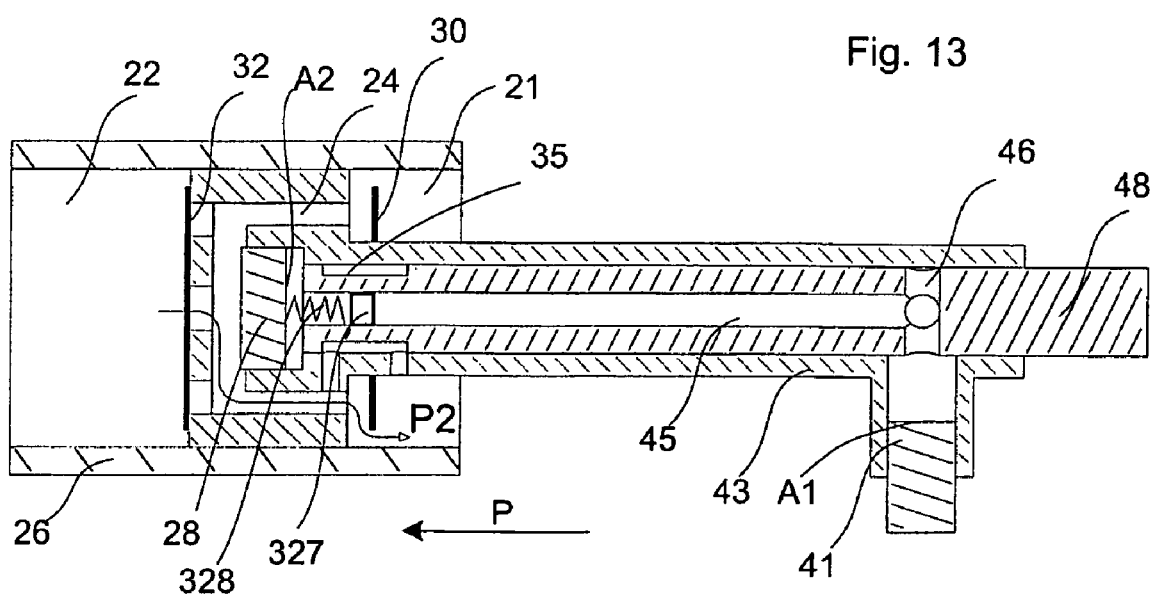
FIG. 13 is another embodiment of the shock absorber according to the present shock absorber.

FIG. 13 is a schematic illustration of another embodiment of the present shock absorber. In the present preferred embodiment the absorber system shown in FIG. 3 is modified in respect of the connection between the master piston 41 and the valve 28. The embodiment shown in FIG. 3 comprises a direct oil connection between the master piston 41 and the valve 28. FIG. 13 shows as an alternative, a biasing means 328 which is positioned directly at the valve 28. Between the biasing means 328 contacting the valve and the oil head or the chamber 45 there is also positioned an additional piston means 327 inside the hollow space 45 or the hollow space 89 shown in FIG. 3. By means of applying force to the master piston 41 the spring is biased via the oil head in chamber 45 and said additional piston means 327, wherein the spring in turn defines the counterforce of the oil required inside the chamber 22 to open the valve. Herein the oil provided in the chamber where the biasing means 328 is positioned, is not in fluid connection with oil in the chambers 21, 22, 24 (i.e. with oil at any point of the path P2).

The invention claimed is:

1. A device for absorbing shocks, in particular for two-wheeled vehicles, having at least one chamber filled with a fluid medium;
    at least one piston means movable in the longitudinal direction of the at least one chamber, which divides the at least one chamber at least into a first subchamber and at least a second subchamber;
    at least one valve positioned between the first subchamber and the second subchamber, which valve can be brought into at least two different positions, wherein at least in a first valve position with the piston means applying a force relative to the chamber at least in a first direction, substantially no medium flow occurs from the second subchamber into the first subchamber;
    wherein at least in a second position of the valve, with the piston means applying a force relative to the chamber in a first direction, a medium flow occurs from the second subchamber into the first subchamber;
    wherein as soon as the pressure applied to the valve reaches a specified threshold level, the valve shifts from the first position to the second position;
    wherein the specified threshold level is adjustable by means of a regulating means coupled to the valve;
    wherein the regulating means comprises a displaceable master piston; and the position of the master piston relative to the device can be changed by an adjusting mechanism; and
    wherein a slave piston means is positioned axially movably and fluid-tight in at least one hollow space.

2. The device according to claim 1, wherein in the first position of the valve, with the piston means moving relative to the chamber in a second direction a medium flow occurs from the first subchamber into the second subchamber.

3. The device of claim 1, wherein the valve can be shifted from the first position into the second position by a specified pressure of the medium at least in one of the two subchambers.

4. The device of claim 1, wherein the regulating means and the valve are connected at least in portions preferably substantially along an actuating shaft preferably by means of a fluid.

5. The device of claim 4, wherein the fluid is a liquid, preferably oil.

6. The device of claim 4, wherein the valve is positioned at an end of the actuating shaft the outer diameter of which is enlarged.

7. The device of claim 6, wherein in the end region on the valve side the actuating shaft has a cover offering at least one flow-through means.

8. The device of claim 7, wherein the cover has a region extending in the direction of the second end of the actuating shaft.

9. The device of claim 8, wherein the inside of the region receives the valve substantially fluid-tight.

10. The device of claim 8, wherein the cover is connected with the actuating shaft to be substantially fluid-tight at least in a second region.

11. The device of claim 8, wherein the valve at the inside of the region of the valve guide can be shifted fluid-tight from the closed into an open position.

12. The device of claim 7, wherein a sealing surface between the valve and the cover is inside an outer contour of an actuating shaft.

13. The device claim 7, wherein the sealing surface between the valve and the cover substantially closes all of the paths designed for the medium to flow from the second subchamber into the first subchamber.

14. The device of claim 7, wherein the sealing surface between the valve and the cover substantially closes all of the paths designed for the medium to flow from the subchamber into the subchamber, except at least an excess pressure channel.

15. The device of claim 6, wherein at least one path of the medium from the second subchamber into the first subchamber runs through the enlarged region of the actuating shaft at least in part.

16. The device of claim 4, wherein an enlarged region of the actuating shaft receives at least one further wall at its inside.

17. The device of claim 16, wherein the inside of the wall receives the valve substantially fluid-tight.

18. The device of claim 16, wherein the valve at the inside of the wall can be shifted fluid-tight from the closed into an open position.

19. The device of claim 16, wherein the at least one path of the medium from the second subchamber into the first subchamber is substantially the only one connection of the two subchambers in the enlarged region of the actuating shaft.

20. The device of claim 16, wherein exchange of the medium between the two subchambers takes place substantially exclusively through the enlarged region of the actuating shaft.

21. The device of claim 16, wherein the piston means in the enlarged region is allocated to the actuating shaft.

22. The device of claim 1, wherein the piston means is connected with an actuating shaft which at its inside has a hollow space at least in portions which preferably contains a fluid medium.

23. The device of claim 22, wherein a regulating means is in fluid connection with the piston means via an inner actuating shaft.

24. The device of claim 1, wherein the path on which the medium passes from the first subchamber into the second subchamber is at least in portions different from the path on which the medium passes from the second subchamber into the first subchamber.

25. The device of claim 1, wherein an annular sealing element is provided on the path from the first subchamber into the second subchamber.

26. The device of claim 25, wherein the sealing element substantially closes the flow passage from the second subchamber into the first subchamber when the valve is closed.

27. The device of claim 1, wherein the valve is positioned inside an actuating shaft.

28. The device of claim 27, wherein the path for the medium from the first subchamber into the second subchamber is inside the actuating shaft at least in portions.

29. The device of claim 27, wherein the path for the medium from the second subchamber into the first subchamber is inside the actuating shaft at least in portions.

30. The device of claim 1, wherein the piston means is in sliding, substantially fluid-tight, connection with an inside wall of the chamber.

31. The device of claim 1, wherein the resistance of the flow of a control medium between the master piston and the valve is larger in one direction than in the opposite direction.

32. The device of claim 1, wherein the at least one chamber includes a first chamber and a second chamber, and wherein the second chamber is filled with a second medium and is positioned substantially rotationally symmetrically around the first chamber.

33. The device of claim 32, wherein the pressure of the second medium within the second chamber can be varied.

34. The device of claim 32, wherein the first medium is a fluid medium, preferably oil.

35. The device of claim 32, wherein the second medium is a gaseous medium, preferably air.

36. The device of claim 1, wherein a biasing means is positioned at the valve.

37. The device of claim 36, wherein the biasing means extends, at least in portions, into at least one hollow space.

38. The device of claim 1, wherein the biasing means is positioned between the slave piston means and the valve.

39. The device of claim 1, wherein when the valve 28 is closed, only at least one end face of the valve contacts an inside of a closing means to be substantially fluid-tight.

40. The device of claim 39, wherein when the valve is open, the at least one end face is subjected to the oil pressure from the chamber.

41. The device of claim 39, wherein the sum of all of the end faces of the valve 28 is at least twice and preferably at least three times the size of the cross-sectional area of a flow passage.

42. A suspension fork comprising an absorber device according to claim 1.

43. The suspension fork of claim 42, wherein the at least one valve can be controlled by an external adjusting unit.

44. The suspension fork of claim 43, wherein the adjusting means for actuating the at least one valve can be mounted in the region of a handlebar and a stem.

45. The suspension fork of claim 43, wherein a master piston is positioned in the region of the adjusting means.

46. The suspension fork of claim 42, wherein the at least one valve is controlled hydraulically.

47. A bicycle having two wheels, both of the wheels each being provided with an absorber unit described in claim 1.

48. The bicycle of claim 47, wherein each said at least one valve of each absorber unit is controlled by a common adjustment means.

49. The bicycle of claim 47, wherein hydraulic control of the at least one valve of each absorber unit is effected by at least one common adjustment means.

50. The bicycle of claim 49, also comprising a handlebar and a stem, wherein the adjusting means for actuating the respective valves of each absorber unit can be mounted in the region of the handlebar and the stem.

51. The bicycle of claim 49, wherein a central master piston for at least two absorber elements is positioned in the region of the adjusting means.

52. The device of claim 1, wherein an adjusting means of the valve is effected by a rotatably supported cam.

53. The device of claim 52, wherein the cam comprises regions at various distances from the axis of rotation.

54. The device of claim 53, wherein during rotation the distances vary continuously at least in portions.

55. The device of claim 52, wherein a shaft is functionally connected to the cam.

56. The device of claim 52, wherein rotation of the cam causes axial displacement of a force transmission unit.

57. The device of claim 56, wherein the displacement of the force transmission unit causes a changed operating characteristic of the valve.

58. The device of claim 57, wherein the force transmission unit acts on a master piston.

59. The device of claim 58, wherein an element provided with spring properties is supported between the force transmission unit and the master piston.

60. The device of claim 1, wherein an actuating knob is functionally attached to a rotatably supported shaft.

61. The device of claim 60, wherein the actuating knob, the rotatably supported shaft and a rotatably supported cam are configured integrally.

62. The device of claim 60, wherein the actuating knob and thus the rotatably supported shaft can be operated from an adjust means.

63. The device of claim 62, wherein the functional connection between the adjust means and the actuating knob is made via a control wire.

64. A device for absorbing shocks, in particular for two-wheeled vehicles, having at least one chamber filled with a fluid medium;

at least one piston means movable in the longitudinal direction of the at least one chamber, which divides the at least one chamber at least into a first subchamber and at least a second subchamber;

at least one valve positioned between the first subchamber and the second subchamber, which valve can be brought into at least two different positions, wherein at least in a first valve position with the piston means applying a force relative to the chamber at least in a first direction, substantially no medium flow occurs from the second subchamber into the first subchamber;

at least in a second position of the valve, with the piston means applying a force relative to the chamber in a first direction, a medium flow occurs from the second subchamber into the first subchamber;

a slave piston means is positioned axially movably and fluid-tight in at least one hollow space;

as soon as the pressure applied to the valve reaches a specified threshold level, the valve shifts from the first position to the second position;

the specified threshold level is adjustable by means of a regulating means coupled to the valve;

the regulating means and the valve are connected at least in portions preferably substantially along an actuating shaft preferably by means of a fluid;

the valve is positioned at an end of the actuating shaft the outer diameter of which is enlarged; and wherein at least one path of the medium from the second subchamber into the first subchamber runs through the enlarged region of the actuating shaft at least in part.

* * * * *